US010066530B2

(12) United States Patent
Zhang

(10) Patent No.: US 10,066,530 B2
(45) Date of Patent: Sep. 4, 2018

(54) EXHAUST GAS MIXER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 14/943,620

(22) Filed: Nov. 17, 2015

(65) Prior Publication Data
US 2017/0138243 A1 May 18, 2017

(51) Int. Cl.
| F01N 3/00 | (2006.01) |
| F01N 3/28 | (2006.01) |
| B01F 5/06 | (2006.01) |
| B01F 3/02 | (2006.01) |
| F01N 3/20 | (2006.01) |

(52) U.S. Cl.
CPC .............. *F01N 3/2892* (2013.01); *B01F 3/02* (2013.01); *B01F 5/0644* (2013.01); *F01N 3/2066* (2013.01); *F01N 2240/20* (2013.01); *F01N 2470/08* (2013.01); *Y02T 10/24* (2013.01)

(58) Field of Classification Search
CPC ............ F01N 2470/30; F01N 2240/20; F01N 3/2892; F02M 29/06; F02M 35/10262; B01F 5/0415; B01F 5/0682; F15D 1/14
USPC .................................................. 60/272–324
See application file for complete search history.

(56) References Cited

U.S. PATENT DOCUMENTS

| 3,923,288 A | 12/1975 | King |
| 4,487,017 A | 12/1984 | Rodgers |
| 4,614,440 A | 9/1986 | King |
| 5,492,408 A | 2/1996 | Alfaré |
| 6,016,651 A | 1/2000 | Hammond et al. |
| 6,074,619 A | 6/2000 | Schoubye |
| 6,769,801 B1 | 8/2004 | Maurer et al. |
| 7,032,578 B2 | 4/2006 | Liu et al. |
| 7,225,623 B2 | 6/2007 | Koshoffer |
| 7,469,529 B2 | 12/2008 | Feuillard et al. |
| 7,581,387 B2 | 9/2009 | Bui et al. |
| 7,621,670 B1 | 11/2009 | England et al. |
| 8,061,890 B2 | 11/2011 | Suhner |
| 8,151,556 B2 | 4/2012 | Oriet et al. |
| 8,341,936 B2 | 1/2013 | Zhang |
| 8,745,978 B2 | 6/2014 | Vanvolsem et al. |
| 2010/0005787 A1 | 1/2010 | Hosoya et al. |
| 2011/0036082 A1 | 2/2011 | Collinot |
| 2012/0180457 A1* | 7/2012 | Liu ........................ F01N 3/2066 60/276 |
| 2012/0204541 A1 | 8/2012 | Li et al. |

(Continued)

FOREIGN PATENT DOCUMENTS

DE   102010056314 A1   6/2012

OTHER PUBLICATIONS

Zhang, Xiaogang, "Exhaust Flow Device," U.S. Appl. No. 14/706,650, filed May 7, 2015, 47 pages.

(Continued)

Primary Examiner — Mark Laurenzi
Assistant Examiner — Anthony Ayala Delgado
(74) Attorney, Agent, or Firm — Julia Voutyras; McCoy Russell LLP

(57) ABSTRACT

Systems are provided for a mixer. In one example, the mixer may include tubes and an outer pipe configured to receive exhaust gas.

18 Claims, 10 Drawing Sheets

(56) References Cited

U.S. PATENT DOCUMENTS

2013/0269325 A1   10/2013   Hadden et al.
2015/0047330 A1    2/2015   Zhang
2015/0122002 A1*  5/2015   Mackaldener ....... G01N 1/2252
                                                             73/114.71

OTHER PUBLICATIONS

Zhang, Xiaogang, "Exhaust Gas Mixer," U.S. Appl. No. 14/823,700, filed Aug. 11, 2015, 47 pages.

* cited by examiner

FIG. 5
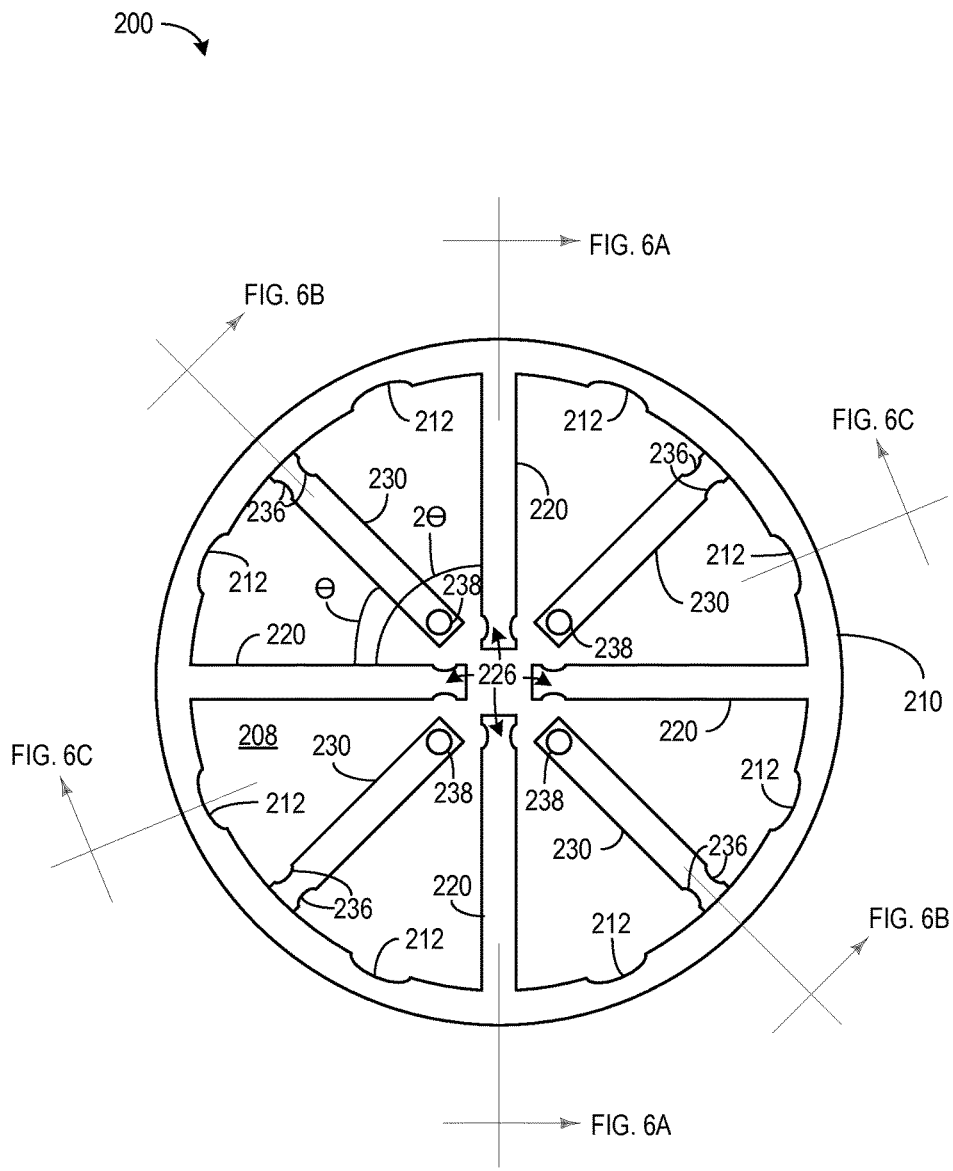
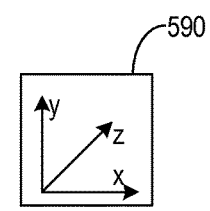

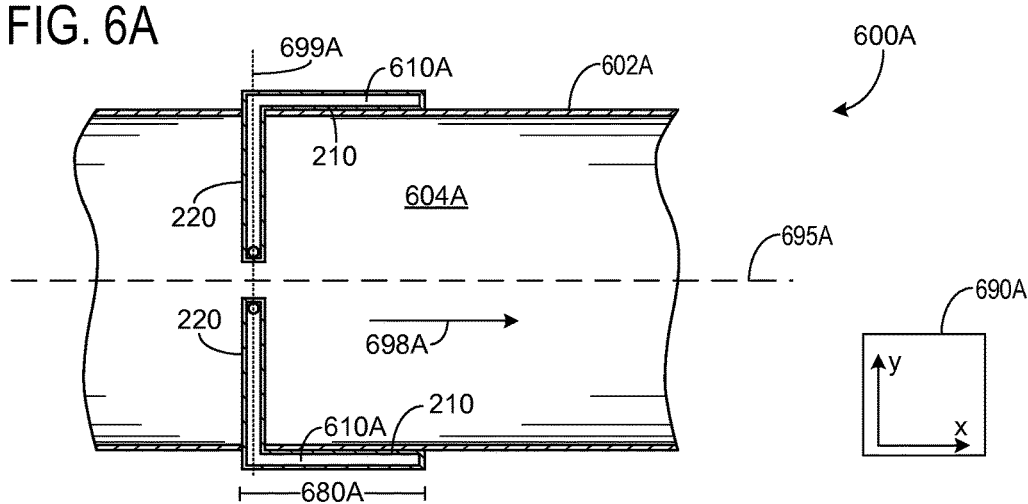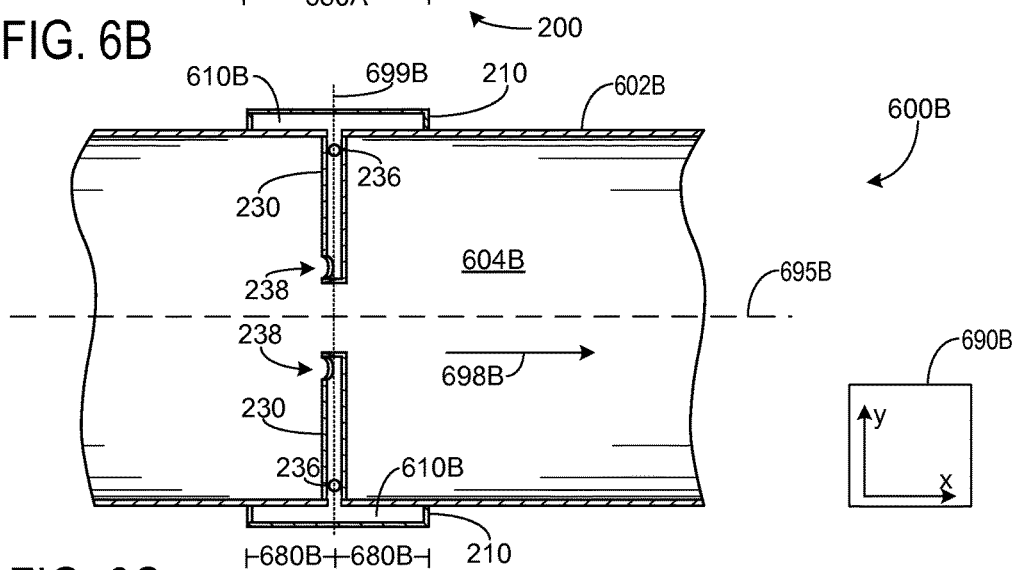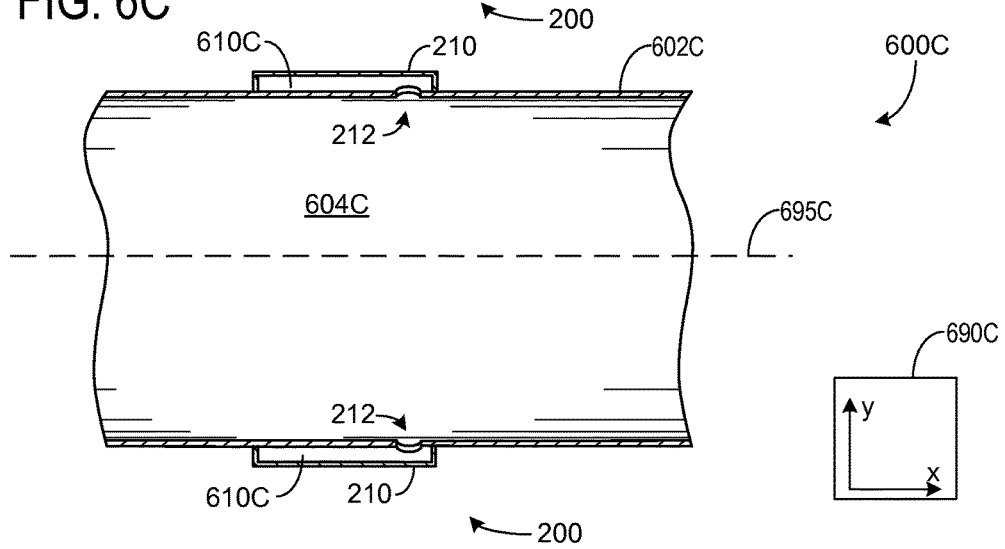

EXHAUST GAS MIXER

FIELD

The present description relates generally to methods and systems for a mixing device.

BACKGROUND/SUMMARY

One technology for after-treatment of engine exhaust utilizes .selective catalytic reduction (SCR) to enable certain chemical reactions to occur between NOx in the exhaust and ammonia ($NH_3$). $NH_3$ is introduced into an engine exhaust system upstream of an SCR catalyst by injecting urea into an exhaust pathway. The urea entropically decomposes to $NH_3$ under high temperature conditions. The SCR facilitates the reaction between $NH_3$ and NOx. to convert NOx into nitrogen ($N_2$) and water ($H_2O$). However, as recognized by the inventor herein issues may arise upon injecting urea into the exhaust pathway. In one example, urea may be poorly mixed into the exhaust flow (e.g., a first portion of exhaust flow has a higher concentration of urea than a second portion of exhaust flow) which may lead to poor coating of the SCR and poor reactivity between emissions (e.g., $NO_x$) and the SCR. Additionally, overly mixing and agitating the urea in the exhaust can likewise cause issues, such as increased deposits.

Attempts to address poor mixing include introducing a mixing device downstream of a urea injector and upstream of the SCR such that the exhaust flow may be homogenous. One example approach is shown by Collinot et al. in U.S. 20110036082. Therein, an exhaust mixer is introduced to an exhaust pathway to both reduce exhaust backpressure as exhaust flows though the mixer and increase exhaust homogeneity. The exhaust mixer comprises one or more helicoids which may manipulate an exhaust flow to flow within an angular range of 0 to 30°.

However, the inventors herein have recognized potential issues with such systems. As one example, the mixer introduced by Collinot has a relatively long body and may additionally comprise one or more mixer bodies adjacent to one another. The mixer bodies may vibrate and collide with one another, due to either road conditions or turbulent exhaust flow, which may produce undesired audible sounds and/or prematurely degrade the mixer.

In one example, the issues described above may be addressed by a mixer with an annular mixer pipe located outside of an exhaust passage, and where mixer tubes extend radially inward from the mixer pipe into the exhaust passage. In this way, exhaust gas flowing out of the mixer flows to regions of the exhaust conduit unperturbed by the mixer and increases an overall homogeneity of exhaust gas in the exhaust conduit. Thus, mixing is increased and a composition of exhaust gas throughout the entire exhaust conduit is substantially equal.

As one example, the mixer tubes are misaligned with one another as are inlets and outlets of the mixer. This allows the mixer may intercept exhaust gas along various regions of the exhaust conduit. The mixed exhaust gas flows back into the exhaust passage along its outer periphery. In this way, exhaust gas is drawn from a central portion of the exhaust passage and redirected to an outer portion of the exhaust passage to increase homogeneity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a face-on isometric view of the mixer.
FIGS. 6A, 6B, and 6C show cross-sectional views of first tubes, second tubes, and downstream openings respectively.
FIGS. 2, 3, 4, and 6A, 6B, 6C, and 7 are drawn approximately to scale, although other relative dimensions may be used, if desired.

DETAILED DESCRIPTION

Figure 1:
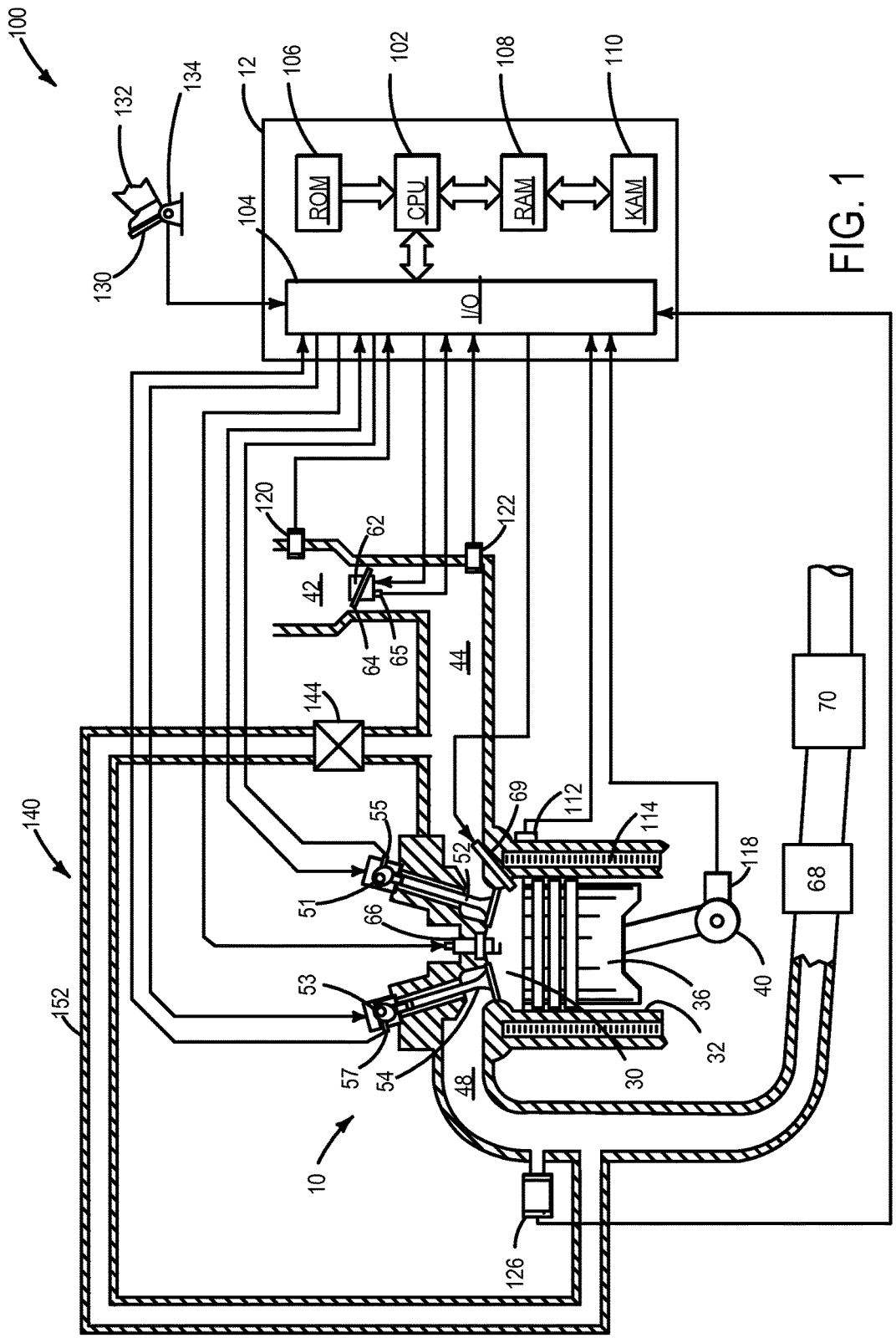
FIG. 1 shows an example cylinder of an engine.
Figure 2:
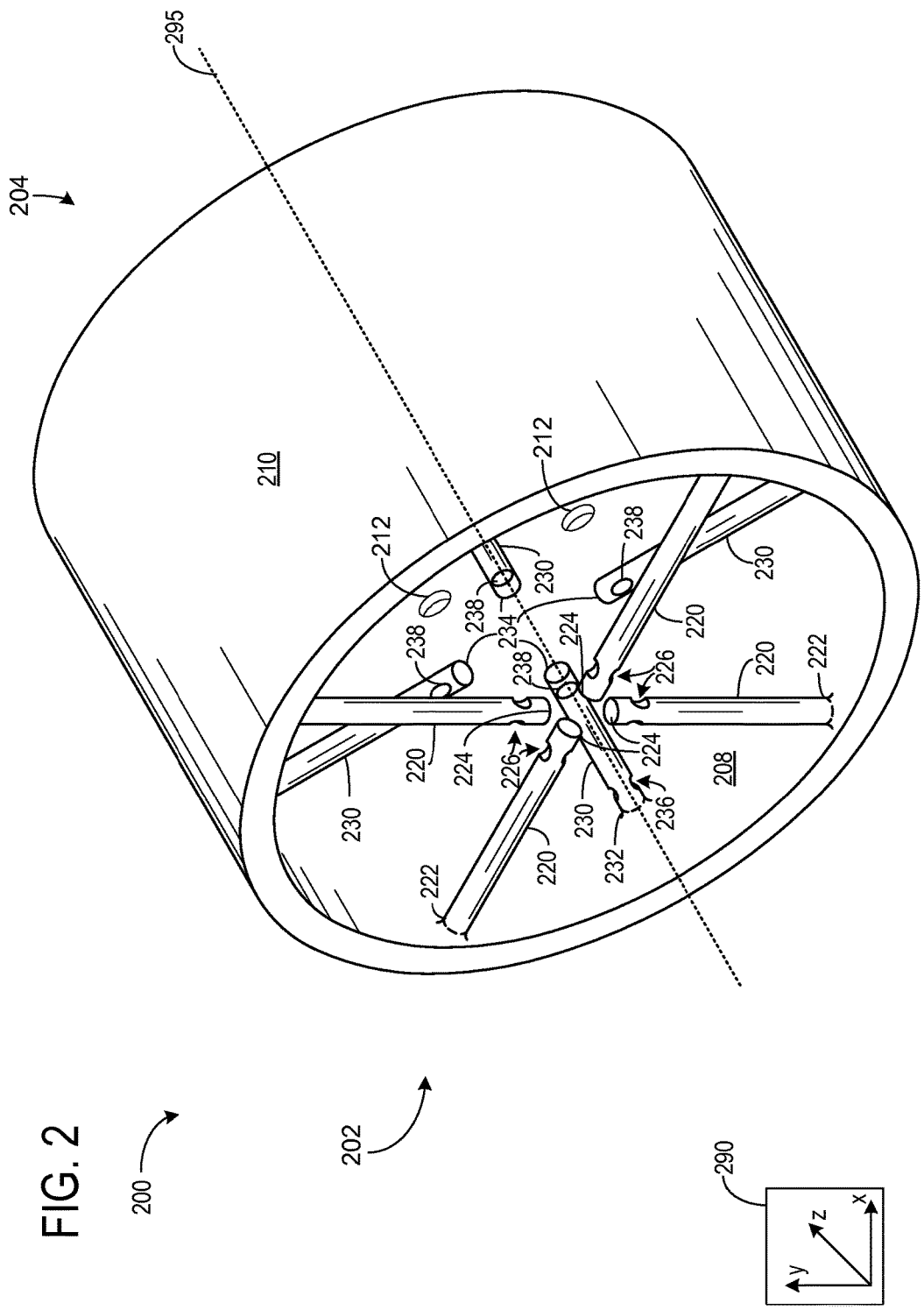
FIG. 2 shows a perspective view of a mixer.
Figure 3:
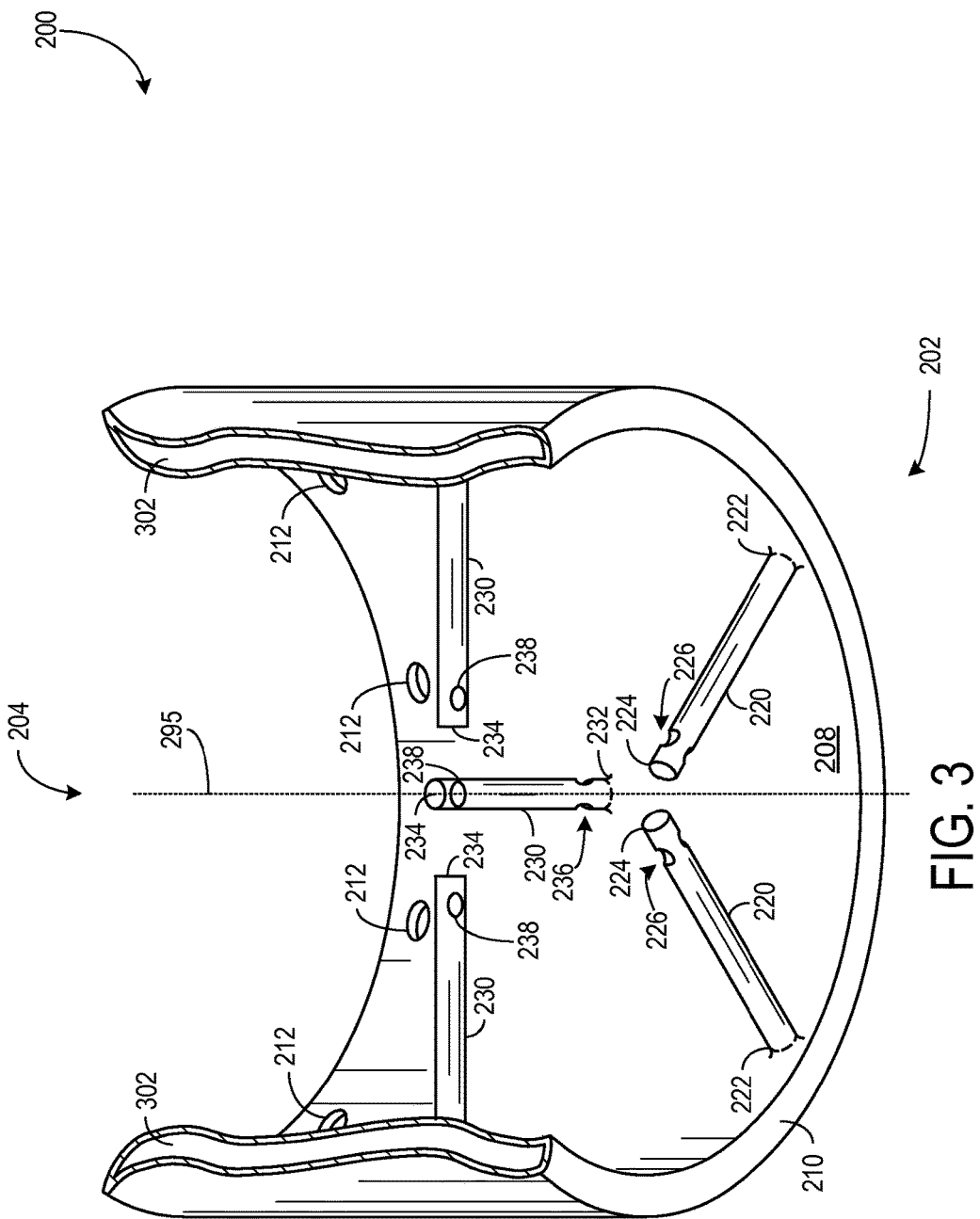
FIG. 3 shows a face-on view of the mixer.
Figure 7:
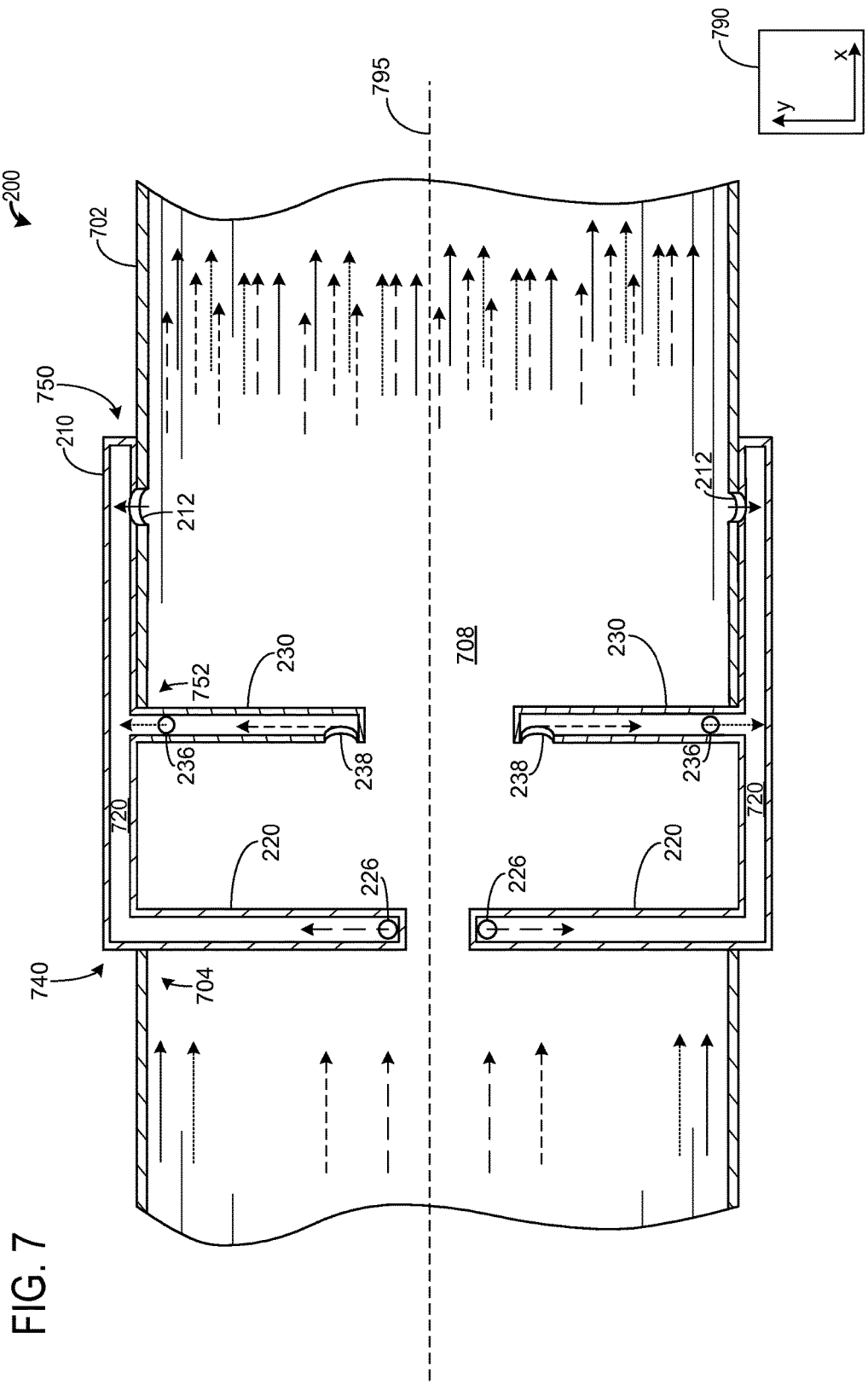
FIG. 7 shows an example exhaust flow flowing through a side-on view of the exhaust mixer in the exhaust conduit.
Figure 8:
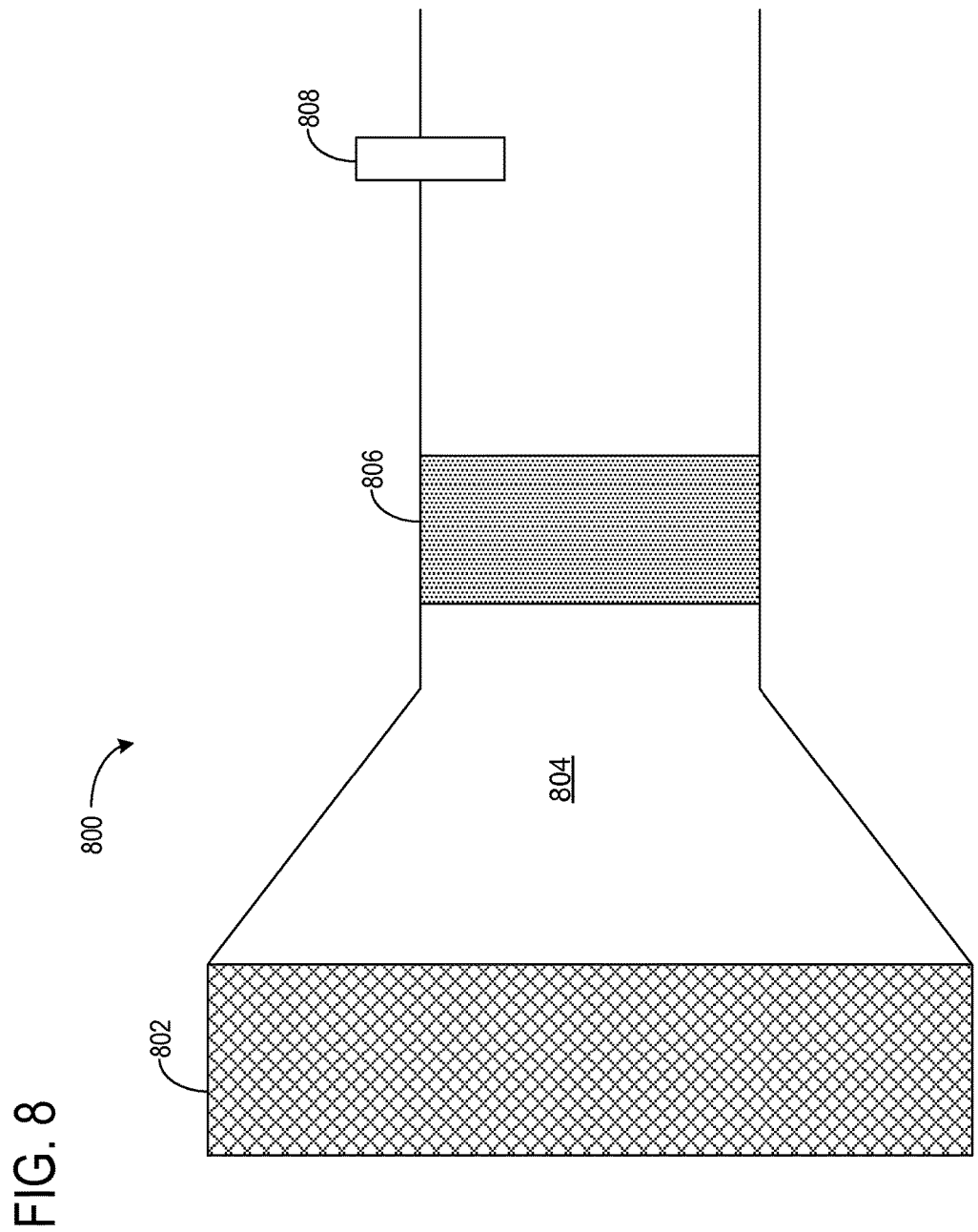
FIG. 8 shows an embodiment with the mixer downstream of a particulate filter.
Figure 9:
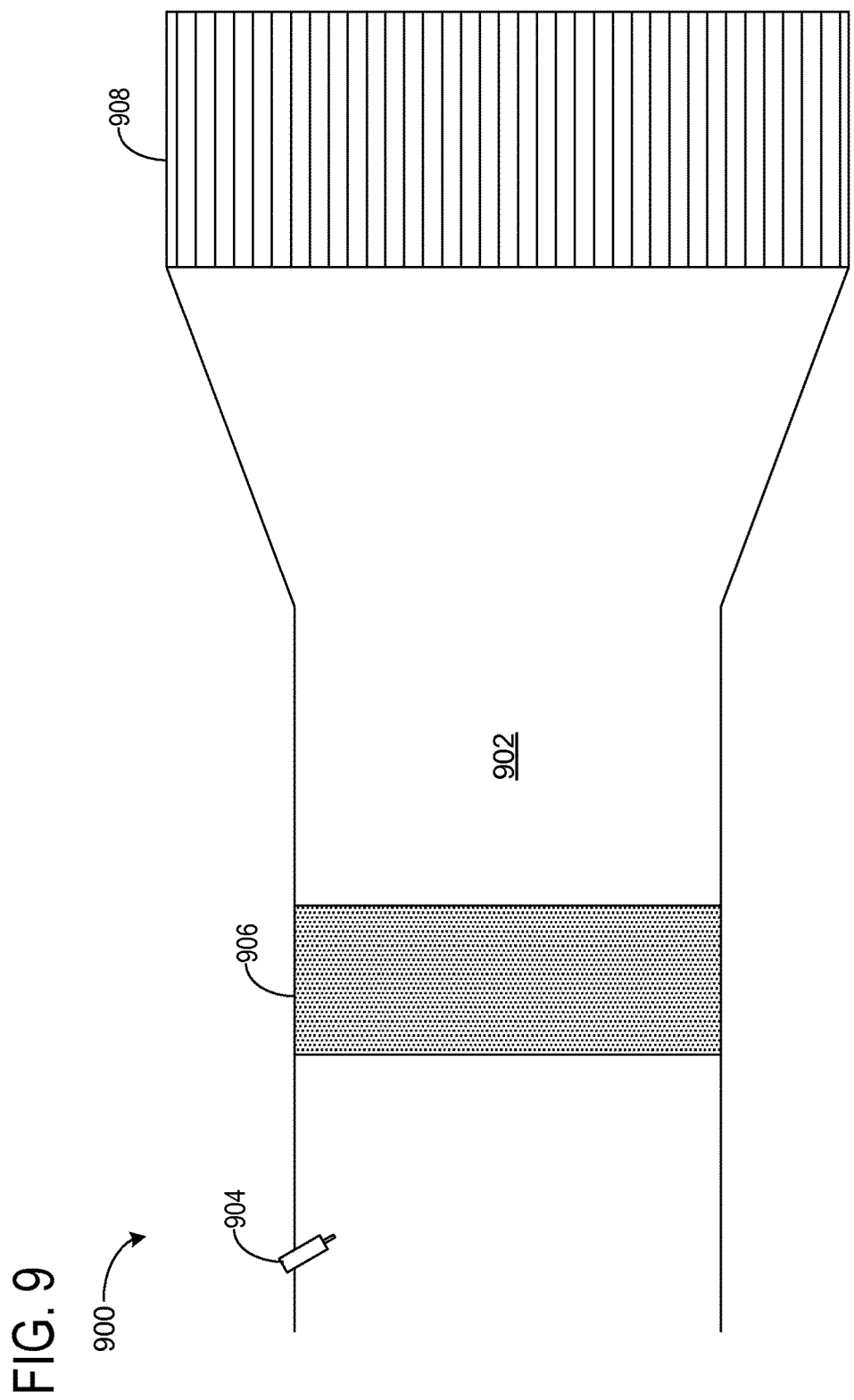
FIG. 9 shows an embodiment with the mixer downstream of a urea injector.
Figure 10:
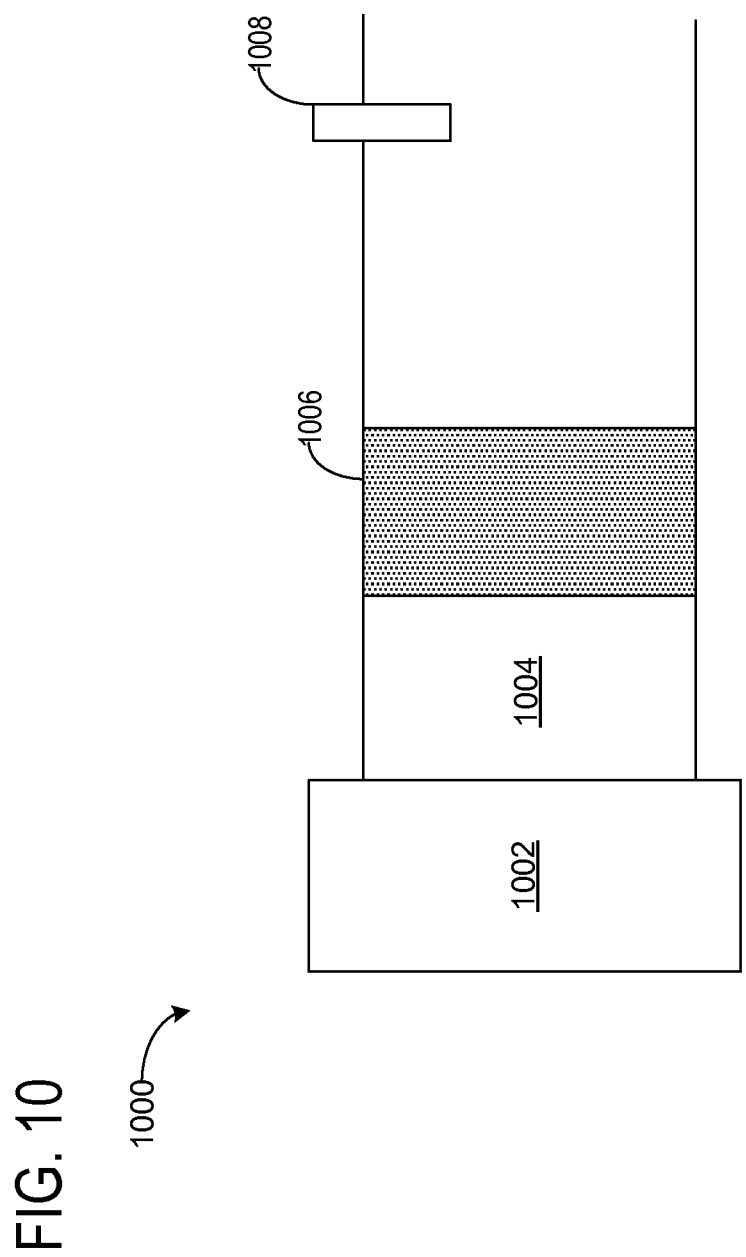
FIG. 10 shows an embodiment with the mixer upstream of a gas sensor.

The following description relates to an example exhaust gas mixer located along an exhaust passage of a vehicle. The mixer redirects exhaust flow generated by operation of an engine. The engine is shown in FIG. 1. Engine operation produces a variety of constituents which may be measured by various sensors for operation of various actuators of the engine. Thus, an exhaust gas measurement may be integral to engine operation. A mixer for mixing an exhaust gas and therefore increasing homogeneity of exhaust gas is shown in FIG. 2 and a face-on view of the mixer is shown in FIG. 3. The mixer is depicted located along an exhaust pipe in FIG. 4. The mixer comprises three separate features within an outer pipe of the mixer. The features are misaligned in order to promote exhaust gas mixing. A face-on view of the mixer depicts the misalignment in FIG. 5. Cross-sectional views of the features of the mixer are shown in FIGS. 6A, 6B, and 6C. The mixer may produce myriad exhaust flows for mixing exhaust gas. Some example flows are shown in FIG. 7. However, other example flows may exist. The mixer may be located downstream of a particulate filter, downstream of a urea injector and upstream of a selective catalytic reductant (SCR), and upstream of an exhaust gas sensor, as shown in FIGS. 8, 9, and 10, respectively.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of both the exhaust gas sensor 126 and a mixer 68. The device 70 may be a three way catalyst (TWC), $NO_x$ trap, selective catalytic reductant (SCR), various other emission control devices, or combinations thereof. In some examples, during operation of the engine 10, the emission control device 70 may be periodically reset by operating at least one cylinder of the engine within a particular air-fuel ratio.

The mixer 68 is shown upstream of the emission control device 70 and downstream of the exhaust gas sensor 126. In some embodiments, additionally or alternatively, a second exhaust gas sensor may be located between the mixer 68 and the emission control device 70. As an example, the mixer 68 may be located downstream of the emission control device 70. The mixer 68 comprises a mixer pipe coupled to an outer surface of the exhaust passage 48 with cylindrical tubes extending from the mixer pipe into the exhaust passage 48. The mixer 68 may perturb an exhaust flow such that homogeneity of an exhaust gas mixture is increased as the exhaust gas flows through the mixer 68.

Figure 4:
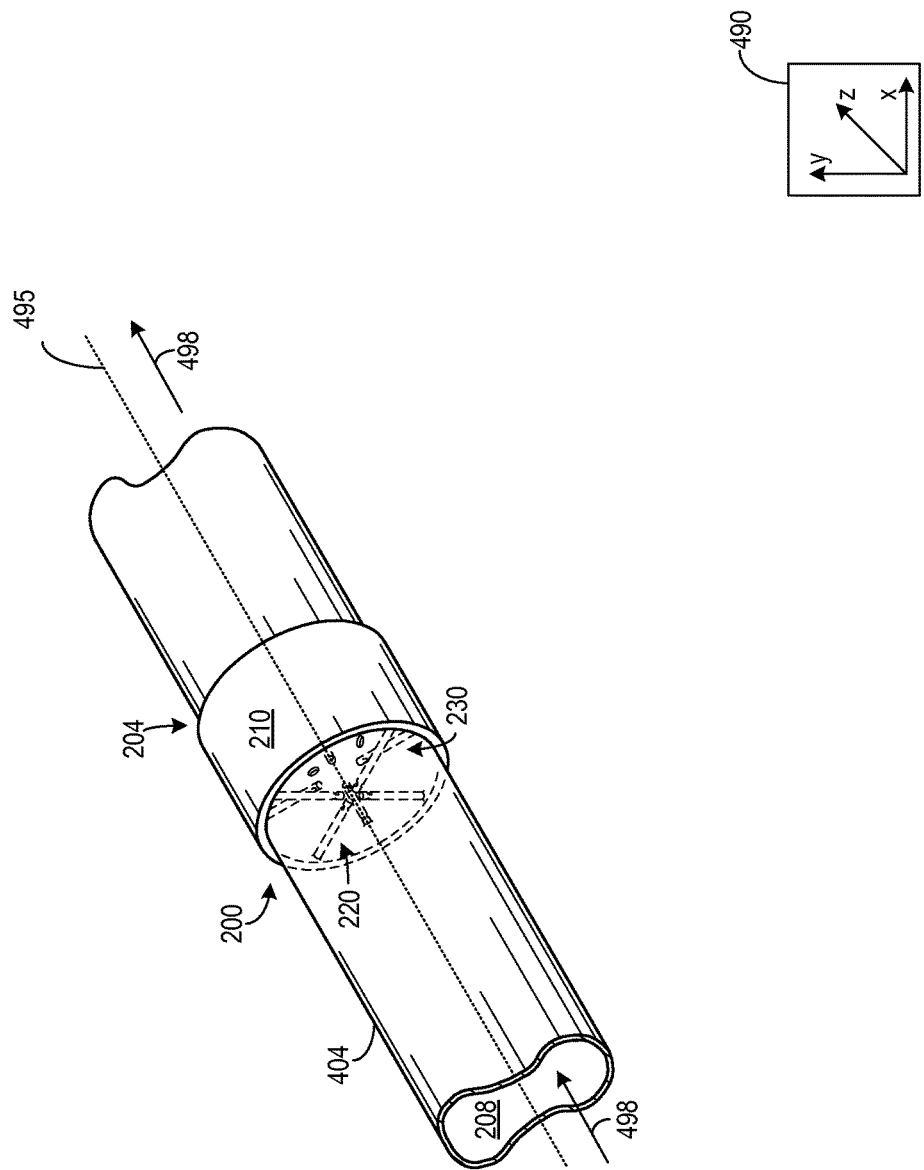
FIG. 4 shows a perspective view of the mixer coupled to an exhaust pipe

The mixer 68 is static (immovable) and is not electrically or mechanically controlled. The mixer may be in abutment with ends of an exhaust pipe. The pipe may be smaller in circumference than the mixer 68 such that a portion of the mixer 68 is located outside of the exhaust pipe. The exhaust pipe may be discontinuous such that a first pipe is coupled to a first end of the mixer 68 and a second pipe is coupled a second end of the mixer 68. An example of the mixer coupled an exhaust pipe is shown in FIG. 4. The mixer 68 will be described in further detail below.

In some embodiments, additionally or alternatively, the exhaust passage may comprise more than one of the mixer 68. For example, there may be exactly two mixers. In the example comprising two mixers, there may be no components located between a first mixer and a second mixer. In other embodiments, the mixers may be separated by one or more exhaust components (e.g., an exhaust gas sensor, a particulate filter, a catalyst, etc.). It will be appreciated by someone skilled in the art that a suitable number of mixers may exist in the exhaust passage 48. The at least two mixers may be oriented in similar or opposite directions.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller.

FIG. 2 shows a perspective view of a mixer 200. The mixer 200 may be used similarly to the mixer 68 of FIG. 1. Such mixers may be used to increase homogeneity of a gas. The mixer 200 comprises an outer pipe 210, first tubes 220, and second tubes 230. In FIG. 2, all three components are shown connected to each other, forming a contiguous and uninterrupted system. The mixer 200 may be located along an exhaust passage 208 with tubes extending from the outer pipe 210 into the exhaust passage. The mixer 200 receives a portion of exhaust flow via inlets and outlets of the tubes and pipe in order to increase an exhaust flow path distance and promote mixing. It will be appreciated by someone skilled in the art that the mixer may be used in other locations of a vehicle or in different types of vehicles for mixing gas.

An axes system 290 is shown comprising three axes, an x-axis in the horizontal direction, a y-axis in the vertical direction, and a z-axis perpendicular to both the x and y axes. A central axis 295 of the mixer 200 is depicted by a dashed line and is parallel to the x-axis. The mixer 200 is symmetric about the central axis 295.

The mixer 200 may be a single, compact machined piece. The mixer 200 may be comprised of one or more of a ceramic material, a metal alloy, a silicon derivative, or other suitable materials capable of withstanding high temperatures while also mitigating friction experienced by an exhaust flow such that an exhaust pressure does not decrease through the mixer 200. Additionally or alternatively, the mixer 200 may comprise one or more coatings and materials such that exhaust may contact surfaces of the mixer 200 without depositing soot.

The mixer 200 comprises an interior passage (not shown) shared between the outer pipe 210, the first tubes 220, and the second tubes 230. The interior passage may be defined as a common space located within surfaces of the mixer for exhaust gas to flow through. The interior passage may receive gas from inlets and outlets of the mixer, where the gas may flow parallel, oblique, and/or perpendicular to gas in the exhaust passage 208. Altering exhaust flow in the interior passage in this way increases a flow distance without increasing a length of the exhaust passage 208. The mixer may further alter exhaust flow (e.g., disrupt a laminar flow or redirect combustion particles) in order to generate turbulence and promote mixing. By doing this, packaging restraints may be decreased while engine operation may improve.

The first tubes 220 and the second tubes 230 are physically coupled to the outer pipe 210. The tubes are non-rotatably fixed and immovable (stationary). The tubes are substantially equal in girth while being unequal in length, wherein the first tubes 220 are longer than the second tubes 230. In some examples, the second tubes 230 may be longer than the first tubes 220. In other examples, the tubes may be substantially equal in length.

A plurality of first tubes 220 are located proximal to an upstream end 202 of the outer pipe 210. In one example, there are exactly four first tubes 220. In another example, there are greater than or less than four first tubes 220. The first tubes 220 are substantially identical in length, diameter, and height. The first tubes 220 are cylindrical, as depicted, however other suitable shapes may be realized. A cross-section of the first tubes along the z-axis is circular. In some embodiments, the cross-section may be elliptical, square, rectangular, triangular, pentagonal, hexagonal, heptagonal, etc.

The first tubes 220 extend radially inward from the outer pipe 210 toward the central axis 295. The first tubes 220 are evenly spaced apart from one another. In one example, first tubes 220 adjacent one another may form a 90° angle. Therefore, first tubes 220 located across from one another are parallel while first tubes 220 located adjacent one another are perpendicular. A first end 222 is physically coupled to the outer pipe 210 and a second end 224 is proximal to the central axis 295. The first ends 222 are open such that the interior passage of the first tubes 220 extends into and is fluidly coupled with the interior passage of the outer pipe 210. The second ends 224 are closed and gas does not flow through them. The second ends 224 are spaced away from each other about the central axis 295. In this way, the first tubes 220 are not physically coupled to each other.

First tube openings 226 are located proximal to the second ends 224 and fluidly coupled the first tubes 220 to the exhaust passage 208. Each of the first tubes 220 comprises at least one of the first tube openings 226. In one example, each tube of the first tubes 220 comprises exactly two first tube openings 226 such that there are exactly eight total first tube openings 226. In another example, each tube comprises more than two first openings 226. The first tube openings 226 are oriented such that a front portion faces the upstream end 202, a back portion faces a downstream end 204, and a middle portion faces the outer pipe 210. Alternatively, the first tube openings 226 may face a radially outward direction relative to the central axis 295. The first tube openings 226 are located opposite one another on sides of the first tubes 220 facing the outer pipe 210. The first tube openings 226 are fluidly coupled to the interior passage, allowing the mixer 200 to receive and/or dispel exhaust gas via the first openings 226. The first tube openings 226 and the first ends 222 are the only openings of the first tubes 220 that gas may flow through. Gas may flow into a first tube 220, into the outer pipe 210, and into a second, different first tube 220.

The second tubes 230 are located between the upstream end 202 and the downstream end 204, downstream of the first tubes 220. In some embodiments, the second tubes 230 may be upstream of the first tubes 220, wherein the second tubes are proximal to the upstream end 202 and the first tubes 220 are between the upstream 202 and downstream 204 ends. A number of second tubes 230 may be equal to a number of first tubes 220. In one example, there may be exactly four first tubes 220 and four second tubes 230. In another example, the number of second tubes 230 is less than or greater than the number of first tubes 220. The second tubes 230 extend radially inward from the outer pipe 210 toward the central axis 295, parallel to the first tubes 220. Second tubes 230 adjacent to each other are perpendicular and second tubes across from each other are parallel. Outer ends 232 of the second tubes 230 are physically coupled to the outer pipe 210. Inner ends 234 of the second tubes are proximal to the central axis 295, distal to the outer pipe 210. The outer ends 232 are open such that the interior passage of the second tubes 230 extends into and is fluidly coupled with the interior passage of the outer pipe 210. The inner ends 234 are closed and gas does not flow through them.

Outer openings 236 are located proximal to the outer ends 232. Inner openings 238 are located proximal to the inner ends 234, distal to the outer openings 236. Outer 236 and inner 238 openings fluidly coupled the second tubes 230 to the exhaust passage 208. In one example a number of outer openings 236 is greater than a number of inner openings 238, wherein there are exactly eight of the outer openings 236 and four of the inner openings 238. Each tube of the second tubes 230 may comprise two outer openings 236 and one of the inner openings 238. The outer openings 236 are located on opposite sides of the second tubes 230 facing a radially outward direction relative to the central axis 295. The outer openings 236 are oriented such that a front portion faces a direction opposite exhaust flow, a back portion faces a direction parallel to exhaust flow, and a middle portion faces a direction perpendicular to exhaust flow, similar to the first openings 226. The inner openings 238 face a direction of incoming exhaust flow, which is from the upstream end 202 to the downstream end 204. The outer openings 236, inner openings 238, and outer ends 232 are the only openings of the second tubes 230 which gas may flow through.

The second tubes 230 are shorter than the first tubes 220, such that the second ends 224 are closer to the central axis 295 than the inner ends 234. The second tubes 230 are evenly spaced away from each other, where a space between the second tubes 230 is substantially equal to the space between the first tubes 220. The second tubes 230 are not physically coupled to each other or to the first tubes 220. The second tubes 230 are not fluidly coupled to each other or to the first tubes 220. However, gas from a first of the second tubes 230 may flow into the outer pipe 210 and into a second, different of the second tubes 230.

The second tubes 230 are radially misaligned with the first tubes 220 by some angle. In one example, the second tubes 230 are rotated about the central axis 295 by exactly 45° relative to the first tubes 220. By misaligning the tubes in this way, the tubes may collect exhaust gas from different regions of an exhaust passage via their corresponding openings. An exhaust gas composition may increase in homogeneity after flowing through one or more portions of the mixer 200, resulting in greater data analysis (e.g., gas composition, soot concentration, etc.) and/or reactivity (e.g., oxidation, reduction, etc.) for a sensor or aftertreatment device, respectively.

The mixer 200 further comprises downstream openings 212 fluidly connecting the outer pipe 210 to the exhaust passage 208. The number of first tube openings 226, outer openings 236, and downstream openings 212 may be equal or unequal. In one example, there are exactly eight of the first tube openings 226, outer openings 236, and downstream openings 212. The first tube openings 226, outer openings 236, the inner openings 238, and downstream openings 212 are radially misaligned relative to the central axis 295. The downstream openings 212, first tube openings 226, outer openings 236, inner openings 238 are the only inlets and outlets fluidly connecting the mixer 200 to the exhaust passage 208. There are no other inlets or outlets other than those described.

Exhaust in the outer pipe 210 may flow into one or more of the exhaust passage 208, the first tubes 220, and the second tubes 230. Exhaust in the first tubes 220 may flow into one or more of the exhaust passage 208 and the outer pipe 210. Exhaust in the second tubes 230 may flow into one or more of the exhaust passage 208 or the outer pipe 210. This allows the mixer to receive exhaust gas through a first feature and direct the exhaust gas to a second future, enabling increased mixing.

FIG. 3 shows a perspective face-on view of the mixer 200. As such, components previously introduced are numbered similarly in subsequent figures. The mixer 200 is a contiguous mixer comprising an outer pipe 210, first tubes 220, and second tubes 230. The mixer 200 is hollow and configured to receive exhaust gas from an exhaust passage 208. A portion of the mixer 200 is omitted to depict interior features of the mixer that would be otherwise occluded in the current view. The three components share an interior passage 302. Gas intercepted by the mixer 200 from the exhaust passage 208 may flow through any portion of the interior passage 302 (in the outer pipe 210, in the first tubes 220, and/or in the second tubes 230) before flowing back into the exhaust passage 208. The mixer 200 is hermetically sealed from an ambient atmosphere, wherein gas from the exhaust passage may not flow through and or around the mixer to an ambient atmosphere.

As described above, the second tubes 230 are angularly offset to the first tubes 220, where the second tubes are rotated about the central axis 295 by 45° compared to the first tubes. Thus, one of the second tubes 230 is located directly behind a space between each of the first tubes 220, as shown in the current depiction and in FIG. 5. A space located along a circumference of the outer pipe 210 is between each of the first 220 and second 230 tubes. Downstream openings 212 are located behind each of the spaces between the tubes. By misaligning the tubes in this way, exhaust gas flowing around the first tubes 220 may flow into the second tubes 230, thereby increasing an area that the mixer 200 may intercept gas. Furthermore, gas flowing between the tubes may flow into the downstream openings 212. Additionally, openings of the mixer 200 (first tube openings 226, outer openings 236, inner openings 238, and downstream openings 212) are arranged such that the mixer may receive and expel gas along a range of inner and outer radii of the exhaust passage 208. In one example, the first tube openings 226 may expel exhaust gas along an inner radius while the outer openings 236 may expel exhaust gas along an outer radius. This may increase turbulence and mixing, which may ultimately increase gas homogeneity leading to improved gas characterization and reactivity.

FIG. 4 shows a perspective view of the mixer 200 located along an exhaust passage 208 outside an exhaust pipe 404. The exhaust pipe is configured to couple to the mixer 200, which is configured to receive exhaust gas from the exhaust passage 208. The mixer 200 comprises features located inside and outside of the exhaust pipe, as described below. Dashed outlines represent features of the mixer 200 occluded by the exhaust pipe 404.

An axes system 490 is shown comprising three axes, an x-axis in the horizontal direction, a y-axis in the vertical direction, and a z-axis perpendicular to both the x and y axes. A central axis 495 of the exhaust passage 208 is depicted by a dashed line and is parallel to the z-axis. Arrows 498 depicts a general direction of exhaust gas through the exhaust passage 208, which is substantially parallel to the z-axis.

The mixer 200 is fused or welded to the exhaust pipe 404 forming a hermetic seal. Gas in the exhaust passage 208 may flow through a central opening of the mixer 200 located interior to the outer pipe 210. The outer pipe 210 resembles a ring and is located outside of the exhaust passage 208 in face-sharing contact with the exhaust pipe 404. The outer pipe 210 is concentric with the exhaust pipe 404. The outer pipe 210 may function as a circular mixing chamber, wherein exhaust gas mixes in the outer pipe 210 outside of the exhaust pipe 404. Gas may not flow between the exhaust pipe 404 and the mixer 200 to an ambient atmosphere. First tubes 220 and second tubes 230 extend from the outer pipe 210 into the exhaust passage 208. In one example, the exhaust pipe 404 may be machined with geometrical openings for receiving the first 220 and second 230 tubes, while preventing exhaust from flowing to the ambient atmosphere. Alternatively, the exhaust pipe 404 may comprise an annular gap for some length of the mixer 200, wherein the tubes protrude through the gap. In this way, the exhaust pipe 404 may be discontinuous (e.g., two pieces) with the mixer 200 physically coupled to corresponding ends of the exhaust pipe 404. Exhaust does not flow out the gap due to the hermetic coupling between the mixer 200 and the exhaust pipe 404. The annular gap is described in greater detail below.

The mixer 200 comprises a plurality of inlets and outlets located along the outer pipe 210, the first tubes 220, and the second tubes 230 fluidly coupling an interior passage (e.g., interior passage 302), shared between the three components of the mixer 200, to the exhaust passage 208, as described above. Exhaust gas from the exhaust passage 208 may enter the mixer 200 and flow through one or more of the outer pipe 210, the first tubes 220, and the second tubes 230. A majority of the mixer 200 is sealed from the exhaust passage 208.

The interior passage of the mixer 200 is located both inside and outside of the exhaust passage 208. For example, a portion of the interior passage in the outer pipe 210 is located completely outside of the exhaust passage 208. As a result, gas in the outer pipe 210 may mix outside of the exhaust pipe 404 before flowing back into the exhaust passage 208. A different portion of the interior passage in the first tubes 220 and the second tubes 230 are located inside of the exhaust passage 208. Gas in the tubes may mix along the exhaust passage 208. Gas flowing from the mixer 200 into the exhaust passage 208 via one or more of the outer pipe 210, the first tubes 220, or the second tubes 230 flows in a direction oblique and/or perpendicular to arrow 498 (exhaust flow).

FIG. 5 shows a face on isometric view of the mixer 200. The mixer 200 is a contiguous mixer comprising an outer pipe 210, first tubes 220, and second tubes 230. The first tubes 220 and second tubes 230 extend into an exhaust passage 208.

An axes system 590 is shown comprising three axes, an x-axis in the horizontal direction, a y-axis in the vertical direction, and a z-axis perpendicular to both the x and y axes. A general direction of gas flow through the exhaust passage 208 is in the z-direction. The mixer 200 is symmetric about the x and y axes.

The outer pipe 210, the first tubes 220, and the second tubes 230 comprise inlets and outlets fluidly connecting the mixer 200 to the exhaust passage 208. Described in an upstream to downstream direction (in the positive z-direction), the first tubes 220 comprise first tube openings 226, the second tubes 230 comprise outer openings 236 and inner openings 238, and outer pipe 210 comprises downstream openings 212.

The first tubes 220, second tubes 230, and downstream openings 212 are radially misaligned such that features of the mixer 200 do not eclipse one another. In this way, features of the mixer 200 (e.g., the first tubes 220 and first tube openings 226, second tubes 230 and outer 236 and inner 238 openings, and downstream openings 212) are complementary. Furthermore, all of the openings are spaced away from one another along at least one or more of the x, y, and z-axes. In this way, the openings are located along unequal regions of the exhaust passage 208. This allows the mixer 200 to receive exhaust gas from different portions of the exhaust passage, which increases a likelihood of receiving different exhaust gas compositions. The exhaust gases may mix and homogenize before flowing out of the mixer 200 and back into the exhaust passage 208.

First 220 and second 230 tubes extend radially inward toward a center of the mixer 200. The first tubes 220 are longer than the second tubes 230, wherein a length of the first tubes is greater than a length of the second tubes. As a result, the first tube openings 226 are located nearer to the center of the mixer 200 than the inner openings 238, enabling the openings to capture different exhaust flows.

The first tubes 220 and the second tubes 230 are oblique to one another wherein none of the first 220 and second 230 tubes are parallel. The first tubes 220 are separated from each other by an angle 2θ. In one example, 2θ may be equal to exactly 90°. The second tubes 230 are also separated from each other by the angle 2θ. The second tubes 230 are rotated about the z-axis relative to the first tubes 220 such that an angle θ separates first 220 and second 230 tubes. In one example, the angle θ is exactly 45°. Downstream openings 212 are located directly behind the angular spaces between the first tubes 220 and the second tubes 230 as shown. In this way, each of the openings may capture gas from different locations of the exhaust passage 208 and return mixed gas to different locations of the exhaust passage 208. Misaligning the mixer 200 in this way may increase gas homogeneity and increase mixing.

FIG. 6A shows a cross-section 600A which includes first tubes 220 along the x-axis of the mixer 200 as depicted in FIG. 5. The cross-section 600A does not include the second tubes or the downstream openings due to the misalignment described above. The cross-section 600A includes an exhaust pipe 602A with an exhaust passage 604A.

An axes system 690A is shown comprising two axes, an x-axis in the horizontal direction and a y-axis in the vertical direction. A central axis 695A of the exhaust passage 604A is depicted by a large dashed line and is parallel to the x-axis. Arrow 698 depicts a general direction of exhaust gas through the exhaust passage 604A, which is substantially parallel to the x-axis. A central axis 699 of the first tubes 220 is shown by a small dashed line. A large dash is bigger than a small dash.

As described above, the outer pipe 210 is annular, completely surrounding the exhaust pipe 602A with first tubes 220 extending through an entire thickness of the exhaust pipe 602A into the exhaust passage 604A. The first tubes depicted align along the central axis 699. The outer pipe 210 and the first tubes 220 are symmetric about the central axis 695A.

First tube openings 226 are located near second ends 224 proximal to the central axis 695. The first tube openings 226 are located on a side of the first tubes 220 facing a direction perpendicular to the x and y axes. Gas from the exhaust passage 604A may flow through the first tube openings 226 and into the first tubes 220, flowing through at least a portion of an interior passage 610A before flowing out of the mixer 200 and back into the exhaust passage 604A. In one example, gas may enter through a first tube 220, flow into the outer pipe 210, and out a second, different first tube 220. The first tube openings 226 emit mixed gas to the exhaust passage 604A in a direction substantially perpendicular to arrow 698 (exhaust flow).

A distance 680A between the first tubes 220 and a downstream of the outer pipe 210 is equal to exactly 50 mm in one example. In another example, the distance 680A may be greater than or less than 50 mm. A shape of the cross-section 600A above or below the central axis 295 is substantially "L-shaped."

FIG. 6B shows a two-dimensional cross-section 600B of second tubes 230 along the x-axis of the mixer 200, as depicted in FIG. 5. The cross-section 600B is farther along the z-axis (more downstream) of FIG. 5 than cross-section 600A of FIG. 6A. Thus, the cross-section 600B does not include the first tubes 220 or the downstream openings 212 due to the misalignment described above.

An axes system 690B is shown comprising two axes, an x-axis in the horizontal direction and a y-axis in the vertical direction. A central axis 695B of the exhaust passage 604B is depicted by a large dashed line and is parallel to the x-axis. Arrow 698B depicts a general direction of exhaust gas through the exhaust passage 604B, which is substantially parallel to the x-axis. A central axis 699B of the second tubes 230 is shown by a small dashed line.

The second tubes 230 extend through an entire thickness of the exhaust pipe 602B via corresponding slots of the pipe. The second tubes 230 are configured to receive and/or expel exhaust gas via outer 236 and inner 238 openings. The exhaust gas may be mixed in any part of the interior passage 610B before flowing back into the exhaust passage 604B. The second tubes 230 align along the central axis 699B. The second tubes 230 and the outer pipe 210 are symmetric about the central axis 695B.

Outer openings 236 are located along an outer periphery of the exhaust passage 604B distal to the central axis 695B. The outer openings 236 are located on a side of the second tubes 230 facing a direction perpendicular to the x and y axes. The outer openings 236 may receive or expel exhaust flow in a direction perpendicular to arrow 698B (exhaust flow). Inner openings 238 are located distal the outer openings 236 proximal to the central axis 695B. The inner openings 238 are located on a side of the second tubes 230 facing a direction of incoming exhaust flow. The inner openings 238 expel exhaust flow in a direction opposite to arrow 698B (exhaust flow).

A distance 680B between the second tubes 230 and an upstream or downstream ends is equal to half the distance 680A of FIG. 6A. Thus, the second tubes 230 are located equally apart from the upstream and downstream ends along a middle of the mixer 200. In one example, the distance 680B is exactly 25 mm. In another example, the second distance is greater than or less than 25 mm. A shape of the mixer 200 along the x-axis, above or below the central axis 695B, is substantially "T-shaped."

FIG. 6C shows a two-dimensional cross-section 600C of the mixer 200 including a portion of the outer pipe 210 along the x-axis, as depicted in FIG. 5. The cross-section 600C is taken farther along the z-axis of FIG. 5 and does not include the first tubes 220 or second tubes 230 due to the misalignment described above.

An axes system 690C is shown comprising two axes, an x-axis in the horizontal direction and a y-axis in the vertical direction. A central axis 695C of the exhaust pipe 602C is depicted by a dashed line and is parallel to the x-axis. Arrow 298 depicts a general direction of exhaust gas through the exhaust passage 208 and is substantially parallel to the x-axis.

The downstream openings 212 extend through an entire thickness of the exhaust pipe 602C fluidly connecting the outer pipe 210 to the exhaust passage 604C. Gas may flow into or out of the downstream openings 212 in a direction perpendicular to arrow 698C (exhaust flow).

FIG. 7 shows cross-sections of FIGS. 6A, 6B, and 6C superimposed so as to show a general cross-section of the mixer 200. In this way, the radial misalignments of the mixer 200 are not depicted in the current embodiment. The mixer 200 comprises an outer pipe 210, first tubes 220, and second tubes 230 with openings for altering an exhaust gas flow. The mixer 200 comprises downstream openings 212, first openings 226, outer openings 236, and inner openings 238 for fluidly coupling an interior passage 720 to the exhaust passage 708. As described above, the openings of the mixer 200 are misaligned with one another. This enables the mixer 200 to receive and/or expel exhaust gas from and/or to different regions of the exhaust passage 708.

An axes system 790 is shown comprising two axes, n x-axis in the horizontal direction and a y-axis in the vertical direction. A central axis 795 of the exhaust passage 202 is depicted by a dashed line and is parallel to the x-axis. Arrow 798 depicts a general direction of exhaust gas through the exhaust passage 708, substantially parallel to the x-axis.

An exhaust pipe 702 is discontinuous with a gap located between the first tubes 220 and the second tubes 230. An upstream portion 704 of the exhaust pipe is physically coupled to an upstream end 740 of the mixer 200. A downstream portion 706 of the exhaust pipe is physically coupled to the outer pipe 210 and the second tubes 230 from a central portion 752 to a downstream end 750. Gas does not flow between the exhaust pipe 702 and the mixer 200.

The exhaust passage 708 may comprise various compounds of unequal composition along different locations of the exhaust passage. For example, exhaust near a center of the exhaust passage 708 may be different than exhaust along an upper portion of the exhaust passage. A first flow is represented by a solid line arrow, a second flow is represented by a small dash arrow, and a third flow is represented by a medium dash arrow, and a fourth flow is represented by a large dash arrow. The flows are shown being symmetric about the y-axis. Therefore, exhaust gas composition changes from the center of the exhaust passage 708 to an outer periphery of the exhaust passage. The flows may include one or more of oxygen, $CO_2$, soot, fuel, urea, nitrogen, etc. at unequal concentrations. Furthermore, one or more of the flows may not comprise one or more of the above listed compounds. The flows may be separated based on a temperature, density, flow rate, etc. The flows may mix within the mixer 200 or in the exhaust passage 708. The mixer 200 is configured to receive gas from different locations throughout the exhaust passage 708 and expel the gas along different locations of the exhaust passage, which may increase an overall homogeneity of the exhaust gas such that a flow along a first portion of the exhaust passage 708 is substantially equal in composition to a flow along a second, different portion of the exhaust passage 708. A direction of the compounds and the exhaust flow is indicated by the arrows.

The first, second, third, and fourth flows may contact an outer body of the second tubes 230 without entering the second tubes. In this way, a direction of the flows may be altered without flowing the flows into the mixer 200. Alternatively, the flows may not contact an outer body of the mixer. In one example, the flows may flow past structures of the mixer 200, but come into contact with mixed gas being expelled from the mixer into the exhaust passage. In this way, exhaust gas may still be mixed without flowing into the mixer 200.

As exhaust flows through the mixer 200, it may initially contact the first tubes 220. As shown, the fourth flow aligns with the first tube openings 226 and may enter the first tubes 220. The exhaust flow may turn substantially 90° in order to flow through the first tube openings 226. The fourth flow may then flow through any portion of the interior passage 720. The fourth flow may flow from the first tubes 220 into the outer pipe 210. Any of the flows may contact an outer body of the first tubes 220 without entering the first tubes 220. A direction of the flows may be altered without flowing the flows into the mixer 200.

The third flow may flow into the inner openings 238 and enters the interior passage 720 of the second tubes 230, where the third flow may flow into the outer pipe 210. The third flow may flow through any portion of the interior passage 720 and combine with other flows (e.g., the fourth flow).

The second flow may flow into the outer openings 236 and enter the interior passage 720 of the second tubes 230, where the second flow may flow into the outer pipe. The second flow may turn substantially 90° in order to flow through the outer openings 236. The second flow may flow through any portion of the interior passage 720 and combine with other flows (e.g., the fourth and/or third flows).

The first flow may flow into the downstream openings 212 and enter the interior passage 720 of the outer pipe 210. The first flow may turn substantially 90° in order to enter the downstream openings 212. The first flow may flow through any portion of the interior passage 720. The first flow may flow through any portion of the interior passage 720, where the first flow may combine with other flows (e.g., the second, third, and/or fourth flow.

One or more of the first, second, third, and fourth flows may mix in any portion of the interior passage 720. Alternatively, one or more of the flows may flow into the mixer 200 without mixing with the other flows. The unmixed flow may exit the mixer through an opening different than an opening used to enter the mixer. Thus, the unmixed flow is redirected by the mixer 200 to a different region of the exhaust passage 708, thereby increasing a likelihood of mixing. For example, the fourth flow may enter the mixer via the first tube openings 226 and flow back into the exhaust passage via the downstream openings 212 without mixing with the first, second, or third flows in the mixer 200. However, by flowing out of the downstream openings 212, a likelihood of mixing the fourth flow with the first flow along the outer periphery of the exhaust passage 708 is increased.

The first, second, third, and/or fourth flows may mix in the outer pipe 210, the first tubes 220, and/or the second tubes 230. The mixture may flow out of any of the openings (the first tube openings 726, the outer openings 736, the inner openings 738, and the downstream openings 712) back into the exhaust passage 708. Gas flowing out of the first tube openings 226, outer openings 236, and downstream openings 212 flows in a direction perpendicular to arrow 798 (e.g., exhaust flow), while gas flowing out of the inner openings 238 flows in a direction opposite to arrow 798. This direction of exhaust outflow from the mixer increases turbulence in the exhaust passage, which may increase exhaust mixing such that an exhaust gas homogeneity is higher downstream of the mixer 200 compared to upstream of the mixer 200.

Turning now to FIG. 8, a system 800 depicts an embodiment of a mixer 806 downstream of a particulate filter 802 and upstream of a soot sensor 808. The soot sensor 808 may send signals to a controller (e.g., controller 12 of FIG. 1) in order to modify various engine actuators accordingly. For example, if a soot sensor detects a soot level being greater than a threshold soot level, then the controller 12 may reduce a torque output of a vehicle such that soot emissions are reduced. In one embodiment, the mixer 806 may be used as the mixer 68 in the embodiment depicted with respect to FIG. 1.

Particulate filter 802 is upstream of mixer 806. As a result, exhaust flow received by the particulate filter 802 may be increasingly heterogeneous compared to exhaust gas flowing through a mixer (e.g., mixer 806), as described above. The particulate filter 802 releases the exhaust gas into a particulate filter outlet cone 804, upstream of the mixer 806. Exhaust flowing into the mixer 806 experiences a mixing substantially similar to mixing described with respect to FIG. 6. The exhaust downstream of the mixer 806 is increasingly homogenous compared to exhaust upstream of the mixer 806. Exhaust flow is analyzed by the soot sensor 808 in order to determine an amount of soot flowing through the particulate filter 802. Due to the location of the soot sensor, only a portion of the exhaust flow may be analyzed. The increase in homogeneity increases the accuracy of the soot sensor 808 reading.

Turning now to FIG. 9, a system 900 depicts an exhaust conduit 902 with a urea injector 904. The urea injector 904 is upstream of a mixer 906. The mixer 906 is upstream of a selective reduction catalyst (SCR) 908. In this way, the urea may mix with an exhaust gas such that an exhaust gas/urea mixture is more homogenous that it would be without flowing through the mixer 906. The mixer 906 increases a pedasis (Brownian motion) between the urea and the exhaust gas. By increasing mixing of urea into the exhaust gas, urea coating surfaces of the SCR 908 may increase in uniformity and thereby increase efficiency. The system 900 may be used as mixer 68 in the embodiment depicted with respect to FIG. 1. In such an example, the mixer 906 is substantially equal to the mixer 68 and the urea injector 904 is located downstream of the gas sensor 126 and upstream of the mixer 68. The SCR 908 is equal to or located within the emission control device 70.

Turning now to FIG. 10, a system 1000 depicts an engine 1002 fluidly coupled to an exhaust conduit 1004. The engine 1002 may be used as engine 10 in the embodiment of FIG. 1. The engine 1002 expels exhaust gas into the exhaust conduit 1004 after combusting. The exhaust gas flows through the exhaust conduit 1004 before reaching a mixer 1006. Exhaust gas is mixed in the mixer 1006 before flowing to a gas sensor 1008 downstream of the mixer. The gas sensor 1008 may be used as the gas sensor 126 in the embodiment of FIG. 1. In this way, the gas sensor 1008 may for accurately measure an exhaust gas due to an increase in homogeneity. For example, if the gas sensor 1008 is a UEGO sensor, then a more accurate air/fuel ratio may be measured compared to an air/fuel ratio measured by a UEGO sensor of an unmixed exhaust gas.

In this way, a compact, easy to manufacture mixer may be located upstream of a variety of exhaust system components in order to increase an accuracy of a sensor reading or to improve efficacy of an exhaust after-treatment device. By placing complementary tubes and openings along the mixer, exhaust gas is redirected and mixed multiple times in order to increase an over homogeneity of exhaust gas in the exhaust passage. The technical effect of placing an exhaust mixer in an exhaust pipe is to improve an exhaust gas mixture homogeneity such that components downstream of the mixer may increase functionality.

An exhaust mixer comprising a plurality of first cylindrical tubes spaced away from a central axis of an exhaust pipe, where each of the first tubes comprises openings facing radially outward from the central axis, a plurality of second cylindrical tubes spaced away from the central axis and the first cylindrical tubes, and an outer pipe coupled to an outside of the exhaust pipe. In a first example the exhaust mixer includes the second tubes comprise upstream-facing inner openings proximal to the central axis and outer openings proximal to the exhaust pipe facing radially outward from the central axis. In a second example, optionally including the first example, the exhaust mixer includes the outer pipe comprises downstream openings, where the downstream openings are proximal to the exhaust pipe, downstream of the first and second tubes relative to an exhaust flow, and facing radially inward to the central axis. A third example, optionally including the first and/or second example, the exhaust mixer includes the first tubes and second tubes are physically and fluidly coupled to the outer pipe. A fourth example, optionally including one or more of the first through third examples, the exhaust mixer includes the first tubes, second tubes, and outer pipe are hollow with an interior passage located therebetween. A fifth example, optionally including one or more of the first to fourth examples, the exhaust mixer includes the openings of the first tubes, second tubes, and outer pipe fluidly couple an exhaust passage to the interior passage. A sixth example, optionally including one or more of the first to fifth examples, the exhaust mixer includes the interior passage of the first and second tubes is located within the exhaust pipe and the interior passage of the outer pipe is located outside the exhaust pipe. In a seventh example, optionally including the first through sixth examples, the exhaust mixer includes the second tubes are angularly offset to the first tubes by 45° along the central axis. An eighth example, optionally including the first through seventh examples, the exhaust mixer includes the first tubes, second tubes, and outer pipe are symmetric about the central axis. A ninth example, optionally including the first through eighth examples, the exhaust mixer includes no other openings in the outer pipe, first tubes, and second tubes other than those specified, where closed ends of the tubes are spaced away from the central axis, and where there is no obstruction along the central axis between the tube ends.

An exhaust gas mixer comprising an upstream end having first tubes, a central portion having second tubes spaced away from the upstream end, wherein the second tubes are rotated about a central axis of an exhaust pipe relative to the first tubes, and an outer pipe physically coupled to an outside of the exhaust pipe and to the first and second tubes. A first example of the exhaust gas mixer includes the first tubes, the second tubes, and the outer pipe are each hollow and fluidly coupled to exhaust flow in the exhaust pipe. A second example, optionally including the first example, of the exhaust gas mixer includes the first tubes and the second tubes are spaced away from the central axis, where the first tubes create four separate tubes at the upstream end and the second tubes create four separate tubes along the central portion. A third example, optionally including one or more of the first and second examples, the exhaust gas mixer includes the first tubes and the second tubes extend radially inward from the outer pipe toward the central axis. A fourth example, optionally including one or more of the first through third examples, the exhaust gas mixer includes the first tubes are longer than the second tubes. A fifth example, optionally including the first through fourth examples, the exhaust gas mixer includes the first tubes, second tubes, and outer pipe are non-rotatably fixed to the exhaust pipe. A sixth example, optionally including one or more of the first through fifth examples, the exhaust gas mixer includes the first tubes, second tubes, and outer pipe are stationary, static mixer components. A seventh example, optionally including one or more of the first through sixth examples, the exhaust gas mixer includes the first tubes, second tubes, and outer pipe each comprise openings facing a direction perpendicular to the central axis that fluidly couple an interior passage to the exhaust passage.

An exhaust gas mixer comprising an outer pipe located outside of an exhaust pipe and fluidly coupled to an exhaust passage, first tubes extending from the outer pipe into the exhaust passage, where each of the first tubes comprises two openings located proximal to an end of each of the first tubes distal to the outer pipe, and second tubes extending from the outer pipe into the exhaust passage, where each of the second tubes comprises two outer openings and one inner opening, the two outer openings are proximal to the outer pipe and the inner openings is distal to the outer pipe. The exhaust gas mixer, additionally or alternatively, further includes the outer pipe comprises downstream openings extending through an entire thickness of the exhaust pipe and radially misaligned with the first and second tubes.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust mixer comprising:
a plurality of first cylindrical tubes spaced away from a central axis of an exhaust pipe, each of the first tubes comprising openings facing radially outward from the central axis;
a plurality of second cylindrical tubes spaced away from the central axis and the first tubes, wherein the second tubes are downstream of and angularly offset to the first tubes; and
an outer pipe coupled to an outside of the exhaust pipe, the first tubes, second tubes, and outer pipe symmetric about the central axis.

2. The mixer of claim 1, wherein the second tubes comprise upstream-facing inner openings proximal to the central axis and outer openings proximal to the exhaust pipe facing radially outward from the central axis.

3. The mixer of claim 1, wherein the outer pipe comprises downstream openings, where the downstream openings are proximal to the exhaust pipe, downstream of the first and second tubes relative to an exhaust flow, and facing radially inward to the central axis.

4. The mixer of claim 1, wherein the first tubes and the second tubes are physically and fluidly coupled to the outer pipe.

5. The mixer of claim 4, wherein the first tubes, the second tubes, and the outer pipe are hollow with an interior passage located therebetween.

6. The mixer of claim 5, wherein the openings of the first tubes, openings of the second tubes, and openings of the outer pipe fluidly couple an exhaust passage to the interior passage.

7. The mixer of claim 5, wherein the interior passage of the first and second tubes is located within the exhaust pipe and the interior passage of the outer pipe is located outside the exhaust pipe.

8. The mixer of claim 1, wherein the second tubes are angularly offset to the first tubes by 45° along the central axis.

9. The mixer of claim 1, wherein there are no other openings in the outer pipe, the first tubes, and the second tubes other than those specified, where closed ends of the tubes are spaced away from the central axis, and where there is no obstruction along the central axis between the tube ends.

10. An exhaust gas mixer, comprising:
an upstream end having first tubes;
a central portion having second tubes spaced away from the upstream end, wherein the second tubes are rotated about a central axis of an exhaust pipe relative to the first tubes; and
an outer pipe physically coupled to an outside of the exhaust pipe and to the first and second tubes.

11. The exhaust gas mixer of claim 10, wherein the first tubes, the second tubes, and the outer pipe are each hollow and fluidly coupled to exhaust flow in the exhaust pipe.

12. The exhaust gas mixer of claim 10, wherein the first tubes and the second tubes are spaced away from the central axis, where the first tubes create four separate tubes at the upstream end and the second tubes create four separate tubes along the central portion.

13. The exhaust gas mixer of claim 10, wherein the first tubes and the second tubes extend radially inward from the outer pipe toward the central axis.

14. The exhaust gas mixer of claim 10, wherein the first tubes are longer than the second tubes.

15. The exhaust gas mixer of claim 10, wherein the first tubes, the second tubes, and the outer pipe are non-rotatably fixed to the exhaust pipe.

16. The exhaust gas mixer of claim 10, wherein the first tubes, the second tubes, and the outer pipe are stationary, static mixer components.

17. The exhaust gas mixer of claim 10, wherein the first tubes, the second tubes, and the outer pipe each comprise openings facing a direction perpendicular to the central axis that fluidly couple an interior passage to an exhaust passage.

18. An exhaust gas mixer comprising:
an outer pipe located outside of an exhaust pipe and fluidly coupled to an exhaust passage;
first tubes extending from the outer pipe into the exhaust passage, where each of the first tubes comprises two openings located proximal to an end of each of the first tubes distal to the outer pipe; and
second tubes extending from the outer pipe into the exhaust passage, where each of the second tubes comprises two outer openings and one inner opening, the two outer openings are proximal to the outer pipe and the inner opening is distal to the outer pipe, wherein the outer pipe comprises downstream openings extending through an entire thickness of the exhaust pipe and radially misaligned with the first and second tubes.

* * * * *